US012573759B2

(12) United States Patent
Lin et al.

(10) Patent No.: US 12,573,759 B2
(45) Date of Patent: Mar. 10, 2026

(54) ANTENNA STRUCTURE

(71) Applicant: Wistron NeWeb Corp., Hsinchu (TW)

(72) Inventors: Hung-Ying Lin, Hsinchu (TW); Kuo-Jen Lai, Hsinchu (TW); Wen-Tai Tseng, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 78 days.

(21) Appl. No.: 18/594,383

(22) Filed: Mar. 4, 2024

(65) Prior Publication Data

US 2024/0313407 A1 Sep. 19, 2024

(30) Foreign Application Priority Data

Mar. 16, 2023 (TW) ................................ 112109745

(51) Int. Cl.
*H01Q 21/22* (2006.01)
*H01Q 9/04* (2006.01)

(52) U.S. Cl.
CPC ........... *H01Q 9/0421* (2013.01); *H01Q 21/22* (2013.01)

(58) Field of Classification Search
CPC ........ H01Q 9/0421; H01Q 21/22; H01Q 1/48; H01Q 9/40; H01Q 1/22; H01Q 1/38; H01Q 5/371; H01Q 5/378; H01Q 9/42
See application file for complete search history.

(56) References Cited

U.S. PATENT DOCUMENTS

| | | | | |
|---|---|---|---|---|
| 10,542,130 B1 * | 1/2020 | Lo | ............................ | H01Q 9/42 |
| 2020/0076061 A1 * | 3/2020 | Chen | .................. | H01Q 21/0068 |
| 2020/0274227 A1 * | 8/2020 | Tu | ............................ | H01Q 7/00 |
| 2022/0399907 A1 * | 12/2022 | Wei | .......................... | H01Q 1/48 |
| 2024/0030615 A1 * | 1/2024 | Cheng | .................... | H01Q 5/378 |

OTHER PUBLICATIONS

Xie et al. CN202759017U (Year: 2012).*

* cited by examiner

*Primary Examiner* — Dameon E Levi
*Assistant Examiner* — Michael M Bouizza
(74) *Attorney, Agent, or Firm* — McClure, Qualey & Rodack, LLP

(57) ABSTRACT

An antenna structure includes a grounding element, a first, a second and a third radiation portion, a shorting radiation portion, a grounding radiation portion, a dielectric substrate, and a first conductive via element. The first radiation portion and the second radiation portion are coupled to a feeding point. The second radiation portion is coupled to the grounding element through the shorting radiation element. The third radiation portion is coupled to the grounding element. A first coupling gap is formed between the grounding radiation element and the grounding element. The dielectric substrate has a first surface and a second surface which are opposite to each other. The first radiation portion is disposed on the first surface. The third radiation portion is disposed on the second surface. The third radiation portion is coupled to the first radiation portion through the first conductive via element.

20 Claims, 4 Drawing Sheets

ANTENNA STRUCTURE

CROSS-REFERENCE TO RELATED PATENT APPLICATION

This application claims the benefit of priority to Taiwan Patent Application No. 112109745, filed on Mar. 16, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure, in particular to a wideband antenna structure.

BACKGROUND OF THE DISCLOSURE

With the development of mobile communication technology, mobile devices have become increasingly popular in recent years. Common examples include laptops, mobile phones, multimedia players, and other portable electronic devices with hybrid functions. To meet people's needs, mobile devices usually have wireless communication capabilities. Some cover long-range wireless communication areas, such as mobile phones using 2G, 3G, LTE (Long Term Evolution) systems and their frequency bands of 700 MHZ, 850 MHZ, 900 MHZ, 1800 MHZ, 1900 MHZ, 2100 MHZ, 2300 MHZ, and 2500 MHz for communication, while others cover short-range wireless communication areas, such as Wi-Fi systems using frequency bands of 2.4 GHz, 5.2 GHz, and 5.8 GHz for communication.

Antennas are essential components in the field of wireless communication. If the bandwidth of the antenna used to receive or transmit signals is insufficient, it can easily cause a decline in the communication quality of the mobile device. Therefore, how to design small-sized, wideband antenna components is an important issue for antenna designers.

SUMMARY OF THE DISCLOSURE

In order to solve the above-mentioned problems, one of the technical aspects adopted by an embodiment of the present disclosure is to provide an antenna structure that includes a grounding element, a first radiation, a second radiation portion, a shorting radiation portion, a third radiation portion, a grounding radiation portion, a dielectric substrate, and a first conductive via element. The first radiation portion is coupled to a feeding point. A second radiation portion is coupled to the feeding point. The second radiation portion and the first radiation portion are extended substantially in opposite directions. The second radiation portion is further coupled to the grounding element through the shorting radiation portion. The third radiation portion is coupled to the grounding element. A first coupling gap is formed between the grounding radiation portion and the grounding element. The dielectric substrate has a first surface and a second surface opposite to each other. The first radiation portion is disposed on the first surface of the dielectric substrate, and the third radiation portion is disposed on the second surface of the dielectric substrate. The first conductive via element penetrates through the dielectric substrate. The third radiation portion is further coupled to the first radiation portion through the first conductive via element.

In some embodiments, the grounding element includes a first grounding segment and a second grounding segment. The first grounding segment is disposed on the first surface of the dielectric substrate, and the second grounding segment is disposed on the second surface of the dielectric substrate.

In some embodiments, the antenna structure further includes one or more second conductive via elements penetrating through the dielectric substrate. The second grounding segment is further coupled to the first grounding segment through the second conductive via elements.

In some embodiments, the second radiation portion, the shorting radiation portion, and the grounding radiation portion are disposed on the first surface of the dielectric substrate.

In some embodiments, the first radiation portion is in the form of an unequally wide rectangular strip.

In some embodiments, the first radiation portion includes a first widening part and a second widening part.

In some embodiments, the first widening part of the first radiation portion has a vertical projection on the second surface of the dielectric substrate, and the vertical projection is overlapped with at least a part of the third radiation portion.

In some embodiments, a second coupling gap is formed between the first widening part of the first radiation portion and the first grounding segment.

In some embodiments, the first widening part of the first radiation portion occupies substantially 4% of the overall area of the antenna structure.

In some embodiments, the third radiation portion is in the form of a meandering shape.

In some embodiments, the grounding radiation portion is in the form of a rectangular strip.

In some embodiments, the antenna structure covers a first frequency band, a second frequency band, and a third frequency band.

In some embodiments, the first frequency band is from 2400 MHz to 2500 MHz, the second frequency band is from 5150 MHz to 5850 MHz, and the third frequency band is from 5925 MHz to 7125 MHz.

In some embodiments, the length of the first radiation portion is smaller than 0.25 times the wavelength of the first frequency band.

In some embodiments, the length of the second radiation portion is approximately equal to 0.25 times the wavelength of the second frequency band.

In some embodiments, the length of the third radiation portion is smaller than 0.25 times the wavelength of the first frequency band.

In some embodiments, the total length of the first radiation portion and the third radiation portion is approximately equal to 0.25 times the wavelength of the first frequency band.

In some embodiments, the length of the grounding radiation portion is approximately equal to 0.25 times the wavelength of the third frequency band.

In some embodiments, the width of the first coupling gap is greater than or equal to 0.3 mm.

In some embodiments, the width of the second coupling gap is from 0.2 mm to 0.5 mm These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
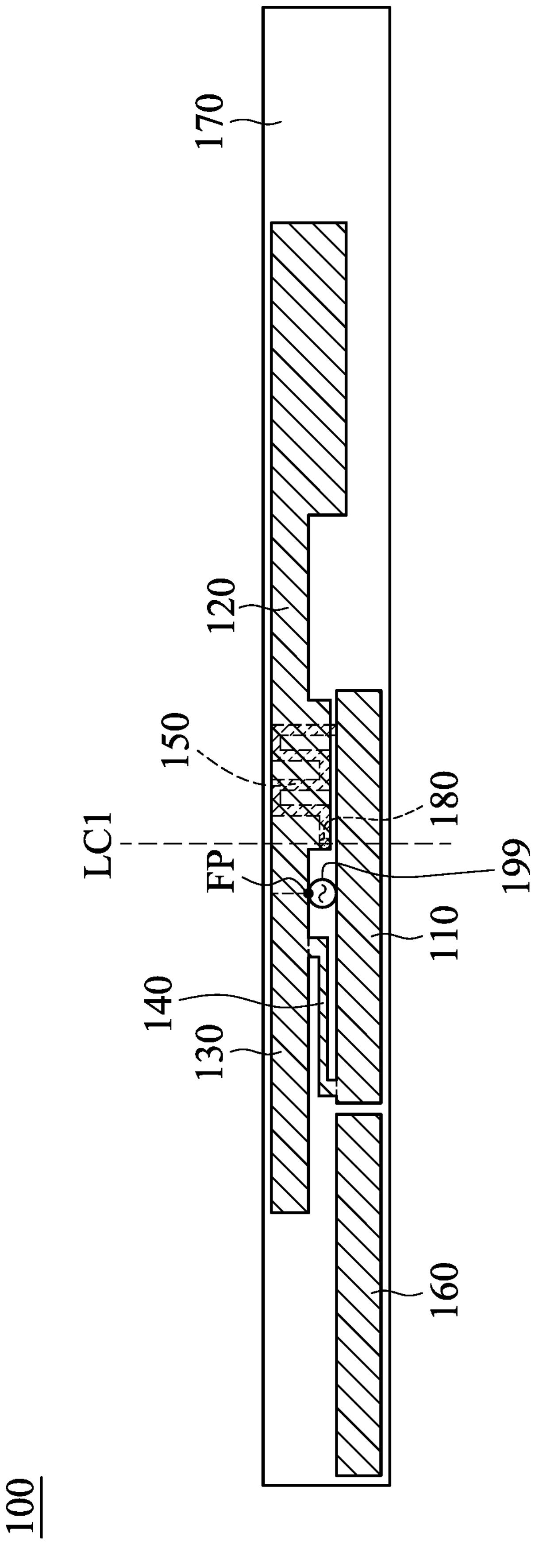
FIG. 1 is a top view of an antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The term "substantially" or "approximately" mentioned throughout the specification and claimed scope refers to a range of acceptable errors within which a person skilled in the art can solve the technical problem with a certain margin of error and achieve the primary technical effect. In addition, the term "coupling" in the present disclosure includes any direct and indirect electrical connection means. Therefore, if the present disclosure states that a first device is coupled to a second device, it means the first device can be directly and electrically connected to the second device, or indirectly and electrically connected to the second device through other devices or connection means.

Figure 2:
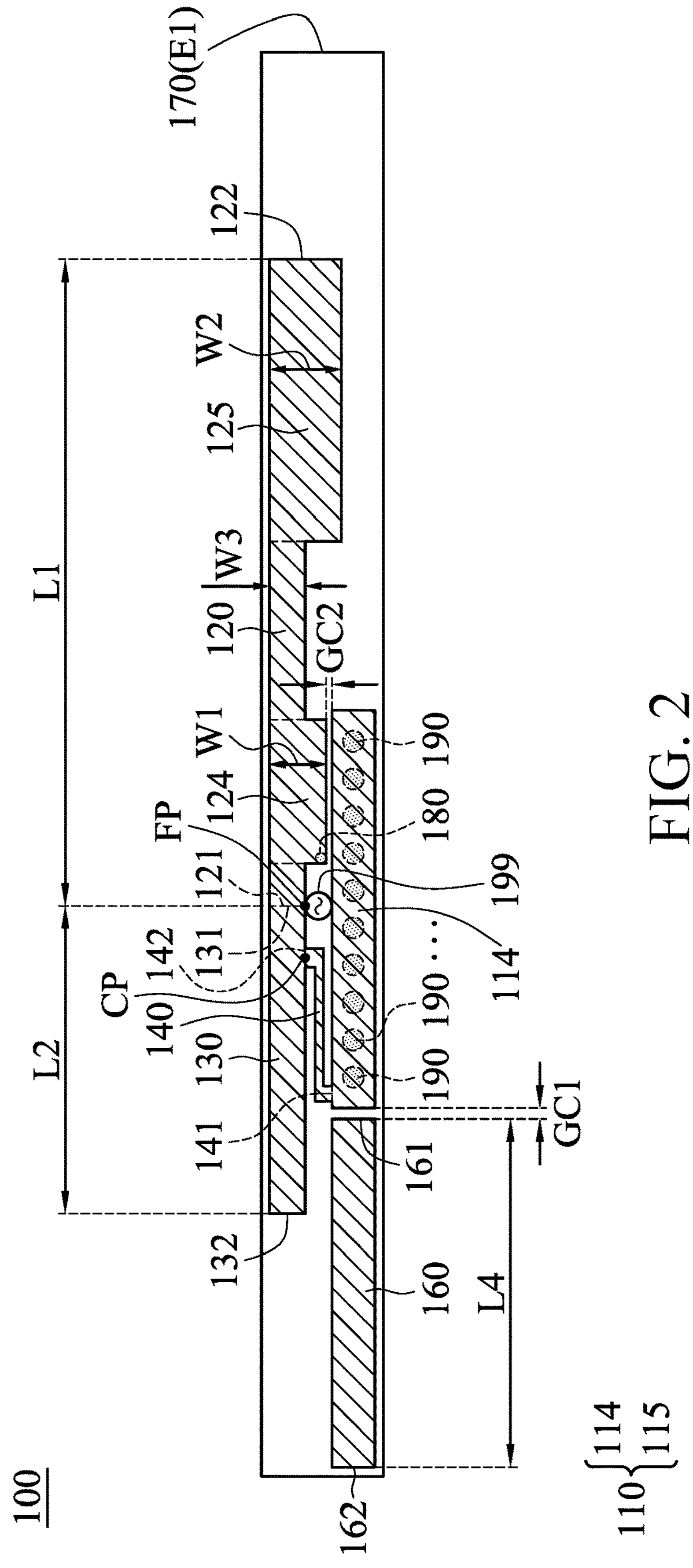
FIG. 2 is a top view of part of the elements of the antenna structure on a first surface of a dielectric substrate according to an embodiment of the present disclosure.

FIG. 1 is a top view of an antenna structure 100 according to an embodiment of the present disclosure. FIG. 2 is a top view of part of the elements of the antenna structure 100 on the first surface E1 of the dielectric substrate 170 according to an embodiment of the present disclosure. The antenna structure 100 can be applied to a mobile device, such as a smartphone, a tablet computer, or a notebook computer, but is not limited thereto. As shown in FIG. 1, the antenna structure 100 includes a grounding element 110, a first radiation portion 120, a second radiation portion 130, a shorting radiation portion 140, a third radiation portion 150, a grounding radiation element 160, a dielectric substrate 170, and a first conductive via element 180. The grounding element 110, the first radiation portion 120, the second radiation portion 130, the shorting radiation portion 140, the third radiation portion 150, the grounding radiation portion 160, and the first conductive via element 180 can be made of metal materials, such as copper, silver, aluminum, iron, or their alloys.

The grounding element 110 can be implemented by a grounding copper foil, which can extend beyond the dielectric substrate 170 and be coupled to a system ground plane (not shown). Specifically, the grounding element 110 includes a first grounding segment 114 and a second grounding segment 115 that are opposite to each other. In some embodiments, the antenna structure 100 further includes one or more second conductive via elements 190, and the second grounding segment 115 can be coupled to the first grounding segment 114 through the second conductive via element 190. However, the present disclosure is not limited thereto. In some other embodiments, the grounding element 110 can also be redesigned to be integrally formed that can be simultaneously distributed on different surfaces of the dielectric substrate 170, and the second conductive via elements 190 can be omitted.

The dielectric substrate 170 can be a flame retardant 4 (FR4) substrate, a printed circuit board (PCB) substrate, or a flexible printed circuit (FPC), but is not limited thereto. The dielectric substrate 170 has a first surface E1 and a second surface E2 opposite to each other. The first grounding segment 114, the first radiation portion 120, the second radiation portion 130, the shorting radiation portion 140, and the grounding radiation portion 160 can all be disposed on the first surface E1 of the substrate 170. The second grounding segment 115 and the third radiation portion 150 can be disposed on the second surface E2 of the dielectric substrate 170. In addition, the first conductive via element 180 and the second conductive via element 190 as mentioned can further penetrate through the dielectric substrate 170.

Figure 3:
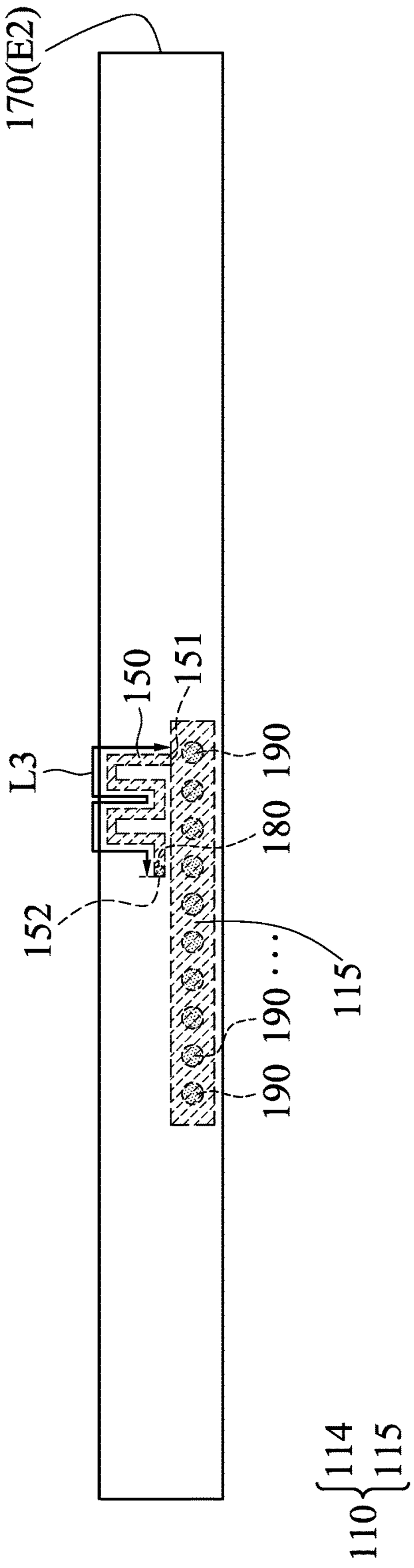
FIG. 3 is a perspective view of another part of the elements of the antenna structure on a second surface of the dielectric substrate according to an embodiment of the present disclosure.
Figure 4:
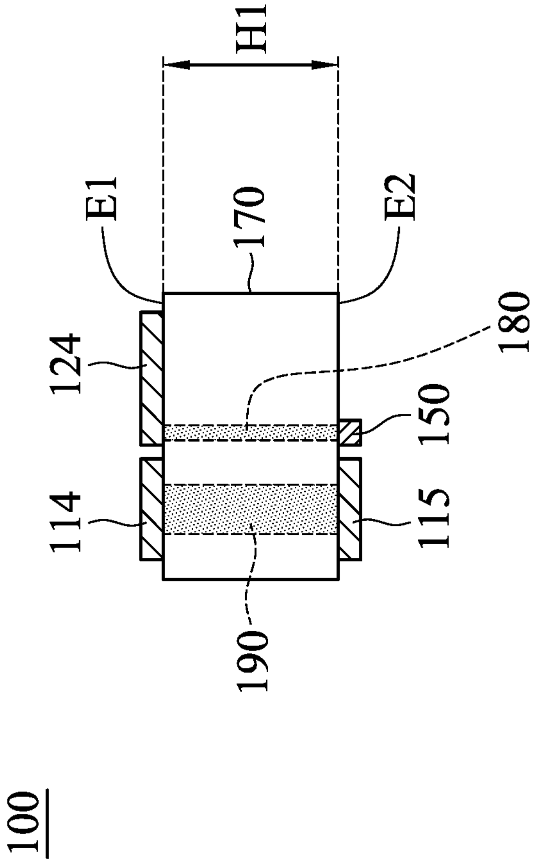
FIG. 4 is a cross-sectional view of the antenna structure according to an embodiment of the present disclosure.

FIG. 3 is a perspective view of another part of the elements of the antenna structure 170 on the second surface E2 of the dielectric substrate 170 according to an embodiment of the present disclosure. FIG. 4 is a cross-sectional view of the antenna structure 100 according to an embodiment of the present disclosure (along a cross-sectional line LC1 in FIG. 1). Please refer to FIGS. 1, 2, 3, and 4 in combination to comprehend the present disclosure.

The first radiation portion 120 can be substantially in the form of an unequally wide rectangular strip. Specifically, the first radiation portion 120 has a first end 121 and a second end 122 in which the first end 121 of the first radiation portion 120 is coupled to a feeding point FP. The second end

122 of the first radiation portion 120 is an open end. The feeding point FP can be further coupled to a signal source 199. For instance, the signal source 199 as mentioned can be a radio frequency (RF) module, which can be used to excite the antenna structure 100. In some embodiments, the first radiation portion 120 includes a first widening part 124 adjacent to the first end 121, and a second widening part 125 adjacent to the second end 122. That is, the second widening part 125 as mentioned can be regarded as a terminal widening part of the first radiation portion 120. For instance, the first widening part 124 of the first radiation portion 120 can be substantially in the form of a smaller rectangle, and the second widening part 125 of the first radiation portion 120 can be substantially a larger rectangle, but is not limited thereto. It is noted that the term "adjacent" or "neighboring" in the present specification refers to the distance between the corresponding two elements being less than a predetermined distance (e.g. 10 mm or less), but it can also include the situation where the corresponding two elements are directly in contact with each other (i.e., the aforementioned distance is reduced to 0).

The second radiation portion 130 can be substantially in the form of a rectangular strip. Specifically, the second radiation portion 130 has a first end 131 and a second end 132. The first end 131 of the second radiation portion 130 is coupled to the feeding point FP. The second end 132 of the second radiation portion 130 is an open end. In some embodiments, the first radiation portion 120 and the second radiation portion 130 can be substantially arranged on the same straight line. For instance, the second end 132 of the second radiation portion 130 and the second end 122 of the first radiation portion 120 can be extended substantially in opposite directions and away from each other.

The shorting radiation portion 140 can be substantially in the form of an N-shape. Specifically, the shorting radiation portion 140 has a first end 141 and a second end 142. The first end 141 of the shorting radiation portion 140 is coupled to the first grounding segment 114. The second end 142 of the shorting radiation portion 140 is coupled to a connection point CP of the second radiation portion 130. Therefore, the second radiation portion 130 can be further coupled to the grounding element 110 through the shorting radiation portion 140.

The third radiation portion 150 can be substantially in the form of a meandering shape, such as an M-shape. Specifically, the third radiation portion 150 has a first end 151 and a second end 152. The first end 151 of the third radiation portion 150 is coupled to the second grounding segment 115. The second end 152 of the third radiation portion 150 can be further coupled to a corner of the first widening part 124 of the first radiation portion 120 through the first conductive via element 180. In some embodiments, the first widening part 124 of the first radiation portion 120 has a vertical projection on the second surface E2 of the dielectric substrate 170. The vertical projection is overlapped with at least a part of the third radiation portion 150. For instance, the third radiation portion 150 can be almost entirely disposed within the vertical projection of the first widening part 124 of the first radiation portion 120.

The grounding radiation portion 160 can be substantially in the form of an equally wide rectangular strip. Specifically, the grounding radiation portion 160 has a first end 161 and a second end 162, which can be two open ends that are away from each other. The first end 161 of the grounding radiation portion 160 is adjacent to the first grounding segment 114. For instance, both the second end 162 of the grounding radiation portion 160 and the second end 132 of the second radiation portion 130 can be extended substantially toward the same direction. In some embodiments, a first coupling gap GC1 can be formed between the first end 161 of the grounding radiation portion 160 and the first grounding segment 114. A second coupling gap GC2 can be formed between the first widening part 124 of the first radiation portion 120 and the first grounding segment 114.

In some embodiments, the antenna structure 100 can cover a first frequency band, a second frequency band, and a third frequency band. For instance, the first frequency band as mentioned can be from 2400 MHz to 2500 MHz, the second frequency band as mentioned can be from 5150 MHz to 5850 MHz, and the third frequency band as mentioned can be from 5925 MHz to 7125 MHz. Therefore, the antenna structure 100 can at least support broadband operation of traditional wireless local area network (WLAN) and next-generation Wi-Fi 6E.

In some embodiment, the operation principle of the antenna structure 100 can be described as follows. The first radiation portion 120 and the third radiation portion 150 can be jointly excited to generate the first frequency band as mentioned, where the addition of the third radiation portion 150 can be used to increase the effective length of the resonant path of the first frequency band as mentioned. The second radiation portion 130 can be excited to generate the second frequency band as mentioned. The grounding radiation portion 160 can be excited to generate the third frequency band as mentioned. According to the result from measurements, the first widening part 124 of the first radiation portion 120 can be used to fine-tune the impedance matching of the third frequency band as mentioned, while the second widening part 125 of the first radiation portion 120 can be used to expand the operational bandwidth of the first frequency band as mentioned. The first coupling gap GC1 must separate the grounding radiation portion 160 and the grounding element 110 from each other. If the first coupling gap GC1 is omitted, the resonant mode of the third frequency band as mentioned will be severely affected. In addition, the design of the second coupling gap GC2 can help fine-tune the impedance matching of both the first frequency band and the third frequency band as mentioned simultaneously.

In some embodiments, the dimensions of elements in the antenna structure 100 may be as follows. The length L1 of the first radiation portion 120 may be less than 0.25 times the wavelength (λ/4) of the first frequency band of the antenna structure 100. The length L2 of the second radiation portion 130 may be approximately equal to 0.25 times the wavelength (λ/4) of the second frequency band of the antenna structure 100. The length L3 of the third radiation portion 150 may be less than 0.25 times the wavelength (λ/4) of the first frequency band of the antenna structure 100. The total length (L1+L3) of the first radiation portion 120 and the third radiation portion 150 may be approximately equal to 0.25 times the wavelength (λ/4) of the first frequency band of the antenna structure 100. The length L4 of the grounding radiation portion 160 may be approximately equal to 0.25 times the wavelength (λ/4) of the third frequency band of the antenna structure 100. The thickness H1 of the dielectric substrate 170 may be from 0.2 mm to 0.8 mm. The width of the first coupling gap GC1 may be greater than or equal to 0.3 mm. The width of the second coupling gap GC2 may be from 0.2 mm to 0.5 mm. In the first radiation portion 120, the width W1 of the first widening part 124 may be from 1.25 mm to 1.75 mm, the width W2 of the second widening part 125 may be from 1.75 mm to 2.25 mm, and the width W3 of the remaining parts may be from 0.75 mm to 1.25 mm. Additionally, the first widening part 124 of the first radiation portion 120 may occupy substantially 4% of the overall area of the antenna structure 100. The range of the element dimensions are determined in accordance with multiple experimental results, which helps optimize the operating bandwidth and impedance matching of the antenna structure 100.

The present disclosure provides a novel antenna structure. Compared with traditional designs, the present disclosure at least has advantages such as small size, wide bandwidth, low profile, and low manufacturing cost, making it suitable for various types of mobile communication devices.

It is noted that the element dimensions, element shapes, and frequency ranges as mentioned are not limiting conditions of the present disclosure. Antenna designers may adjust these settings according to different needs. The antenna structure of the present invention is not limited to the states shown in FIGS. 1 to 4. The present disclosure may include any one or more features of any one or more embodiments shown in FIGS. 1-4. In other words, not all of the features illustrated need to be implemented simultaneously in the antenna structure of the present disclosure.

The numbering in the specification and claims, such as "first," "second," "third," and so on, have no order of priority between them. They are only used to differentiate between two components with the same name.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a grounding element;

a first radiation portion coupled to a feeding point;

a second radiation portion coupled to the feeding point, wherein the second radiation portion and the first radiation portion are extended substantially in opposite directions;

a shorting radiation portion, wherein the second radiation portion is further coupled to the grounding element through the shorting radiation portion;

a third radiation portion coupled to the grounding element;

a grounding radiation portion, wherein a first coupling gap is formed between the grounding radiation portion and the grounding element;

a dielectric substrate having a first surface and a second surface opposite to each other, wherein the first radiation portion is disposed on the first surface of the dielectric substrate, and the third radiation portion is disposed on the second surface of the dielectric substrate; and a first conductive via element penetrating through the dielectric substrate, wherein the third radiation portion is further coupled to the first radiation portion through the first conductive via element;

wherein the grounding radiation portion is not directly connected to the grounding element.

2. The antenna structure according to claim 1, wherein the grounding element comprises a first grounding segment and a second grounding segment, the first grounding segment is disposed on the first surface of the dielectric substrate, and the second grounding segment is disposed on the second surface of the dielectric substrate.

3. The antenna structure according to claim 2, further comprising:

one or more second conductive via elements penetrating through the dielectric substrate, wherein the second grounding segment is further coupled to the first grounding segment through the second conductive via elements.

4. The antenna structure according to claim 2, wherein the first radiation portion comprises a first widening part and a second widening part.

5. The antenna structure according to claim 4, wherein the first widening part of the first radiation portion has a vertical projection on the second surface of the dielectric substrate, and the vertical projection is overlapped with at least a part of the third radiation portion, and a second end of the third radiation portion is further coupled to a corner of the first widening part of the first radiation portion through the first conductive via element.

6. The antenna structure according to claim 4, wherein a second coupling gap is formed between the first widening part of the first radiation portion and the first grounding segment.

7. The antenna structure according to claim 6, wherein the width of the second coupling gap is from 0.2 mm to 0.5 mm.

8. The antenna structure according to claim 4, wherein the first widening part of the first radiation portion occupies substantially 4% of the overall area of the antenna structure.

9. The antenna structure according to claim 1, wherein the second radiation portion, the shorting radiation portion, and the grounding radiation portion are disposed on the first surface of the dielectric substrate.

10. The antenna structure according to claim 1, wherein the first radiation portion is in the form of an unequally wide rectangular strip.

11. The antenna structure according to claim 1, wherein the third radiation portion is in the form of a meandering shape.

12. The antenna structure according to claim 1, wherein the grounding radiation portion is in the form of a rectangular strip.

13. The antenna structure according to claim 1, wherein the width of the first coupling gap is greater than or equal to 0.3 mm.

14. The antenna structure according to claim 1, wherein the antenna structure covers a first frequency band, a second frequency band, and a third frequency band.

15. The antenna structure according to claim 14, wherein the first frequency band is from 2400 MHz to 2500 MHz, the second frequency band is from 5150 MHz to 5850 MHz, and the third frequency band is from 5925 MHz to 7125 MHz.

16. The antenna structure according to claim 14, wherein the length of the second radiation portion is approximately equal to 0.25 times the wavelength of the second frequency band.

17. The antenna structure according to claim 14, wherein the length of the third radiation portion is smaller than 0.25 times the wavelength of the first frequency band.

18. The antenna structure according to claim 14, wherein the total length of the first radiation portion and the third radiation portion is approximately equal to 0.25 times the wavelength of the first frequency band.

19. The antenna structure according to claim 14, wherein the length of the grounding radiation portion is approximately equal to 0.25 times the wavelength of the third frequency band.

20. The antenna structure according to claim 14, wherein the length of the first radiation portion is smaller than 0.25 times the wavelength of the first frequency band.

* * * * *